United States Patent
Granier et al.

(10) Patent No.: US 12,116,548 B2
(45) Date of Patent: Oct. 15, 2024

(54) ORGANIC COMPOUNDS

(71) Applicant: GIVAUDAN SA, Vernier (CH)

(72) Inventors: Thierry Granier, Duebendorf (CH);
Julie Charpentier, Basel (CH);
Gerhard Brunner, Opfikon (CH);
Sandro Dossenbach, Gossau (CH);
Felix Flachsmann, Duebendorf (CH);
Andreas Goeke, Duebendorf (CH)

(73) Assignee: GIVAUDAN SA, Vernier (CH)

( * ) Notice: Subject to any disclaimer, the term of this patent is extended or adjusted under 35 U.S.C. 154(b) by 541 days.

(21) Appl. No.: 17/429,038

(22) PCT Filed: Feb. 19, 2020

(86) PCT No.: PCT/EP2020/054368
§ 371 (c)(1),
(2) Date: Aug. 6, 2021

(87) PCT Pub. No.: WO2020/173790
PCT Pub. Date: Sep. 3, 2020

(65) Prior Publication Data
US 2022/0119734 A1    Apr. 21, 2022

(30) Foreign Application Priority Data
Feb. 26, 2019    (GB) .................................... 1902566

(51) Int. Cl.
*C11B 9/00* (2006.01)
*A23L 27/20* (2016.01)

(52) U.S. Cl.
CPC .......... *C11B 9/0049* (2013.01); *A23L 27/203* (2016.08)

(58) Field of Classification Search
CPC .............................. C11B 9/0049; A23L 27/203
(Continued)

(56) References Cited

U.S. PATENT DOCUMENTS 3,943,073 A    3/1976    Naegeli et al.

FOREIGN PATENT DOCUMENTS

| EP | 2402301 A1 | 1/2012 |
|----|-----------|--------|
| EP | 3255151 A2 | 12/2017 |

(Continued)

OTHER PUBLICATIONS

International Search Report and Written Opinion of the International Searching Authority for corresponding application PCT/EP2020/054368 dated May 20, 2020.

(Continued)

*Primary Examiner* — Subbalakshmi Prakash
(74) *Attorney, Agent, or Firm* — Norris McLaughlin PA

(57) ABSTRACT

Compounds according to formula I in the form of any one of its stereoisomers or a mixture thereof formula I

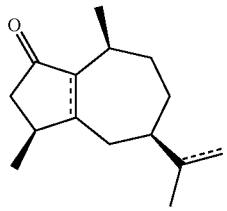

wherein
⚌ is indicating a single bond or a double bond, and the compound has overall one carbon-carbon double bond or no carbon-carbon double bond at all,
and their use as flavor or fragrance ingredient.

10 Claims, 2 Drawing Sheets

Overlay of Rotundone (black) and (-)-(3S,5R,8S)-5-isopropyl-3,8-dimethyl-3,4,5,6,7,8-hexahydroazulen-1(2H)-one (compound of formula II, grey)

(58) Field of Classification Search
USPC .......................................................... 426/538
See application file for complete search history.

(56) References Cited

FOREIGN PATENT DOCUMENTS

| | | |
|---|---|---|
| JP | 2017206451 A | 11/2017 |
| WO | 2019110299 A1 | 6/2019 |
| WO | 2019110493 A1 | 6/2019 |

OTHER PUBLICATIONS

Kapadia, V.H., et al.: "Sesquiterpenoids from the essential oil of cyperus rotundus", Tetrahedron Letters, vol. 8, No. 47, Jan. 1, 1967.
Wood, C.,: "From Wine to Pepper: Rotundone, an Obscure Sesquiterpene, Is a Potent Spicy Aroma Compound", J. Agric. Food Chem. 2008, 56, 3738-3744.
Nakanishi, A., et al.: "Identification and Characterization of 3-epi-Rotundone, a Novel Stereoisomer of Rotundone, in Several Kinds of Fruits", J. Agric. Food Chem., 2017, 65, 5209-5214.
Shono, T., et al.: "Electroorganic Chemistry 140. Electroreductively Promoted Intra- and Intermolecular Couplings of Ketones with Nitriles1", J. Org. Chem., 1992, 57, 7157-7187.
Huang, A., et al.: "Comparison of the Formation of Peppery and Woody Sesquiterpenes Derived from a-Guaiene and a-Bulnesene under Aerial Oxidative Conditions", J. Agric. Food Chem., 2015, 63 (7), 1932-1938.

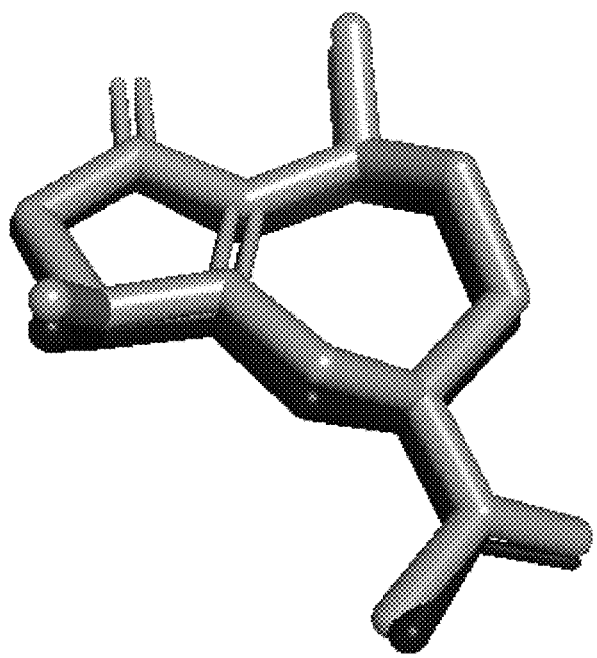
Figure 1: Overlay of Rotundone (black) and (-)-(3S,5R,8S)-5-isopropyl-3,8-dimethyl-3,4,5,6,7,8-hexahydroazulen-1(2H)-one (compound of formula II, grey)
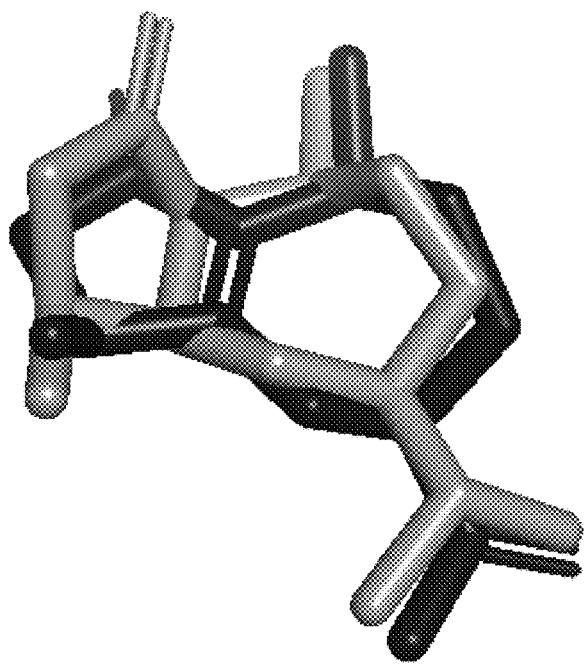
Figure 2: Overlay of Rotundone (black) and cis-Tetrahydrorotundon ((3S,3aS,5R,8S,8aS)-5-isopropyl-3,8-dimethyloctahydroazulen-1(2H)-one, compound of formula IVa, grey)

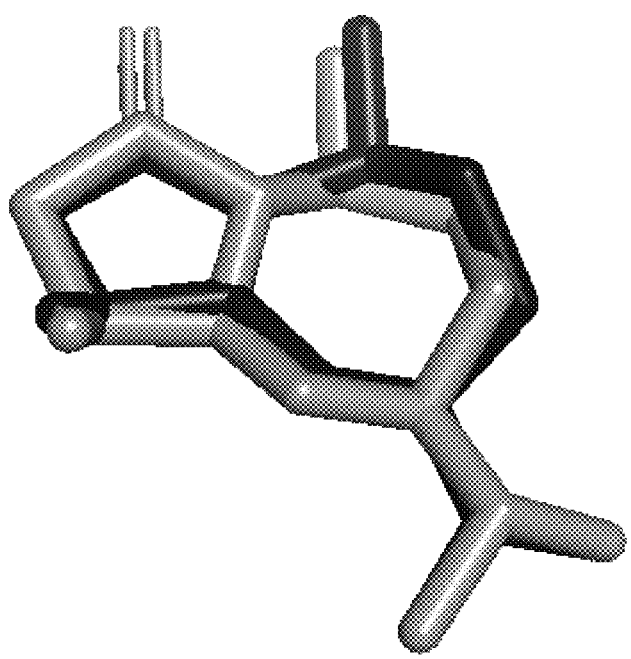
Figure 3: Overlay of Rotundone (black) and trans-Tetrahydrorotundone ((3S,3aS,5R,8S,8aR)-5-isopropyl-3,8-dimethyloctahydroazulen-1(2H)-one,compound of formula IVc, grey)

ORGANIC COMPOUNDS

This is an application filed under 35 USC 371 based on PCT/EP2020/054368 (WO 2020/173790), filed 19 Feb. 2020, which in turn is based on GB 1902566.7 filed 26 Feb. 2019. The present application claims the full priority benefit of these prior applications and herein incorporates by reference the full disclosures of these prior applications.

This invention relates to novel organic compounds, a method of preparing said compounds and their use as fragrance or flavor ingredients. The invention also relates to fragrance compositions and to articles, such as fine fragrances or consumer product compositions perfumed by the compounds or the fragrance compositions containing said compounds. Furthermore, the invention relates to flavor compositions and to consumables flavored by the compounds or the flavor compositions containing said compounds. In particular, the present invention is directed to hydrogenated derivatives of Rotundone, to fragrance or flavor ingredients and to a use of such fragrance or flavor ingredients.

Rotundone ((3S,5R,8S)-3,8-dimethyl-5-prop-1-en-2-yl-3,4,5,6,7,8-hexahydro-2H-azulen-1-one) is a sesquiterpene originally discovered in the tubers of *Cyperus rotundus*. The compound has a strong spicy peppercorn aroma and a woody odor. It was later also found to be an important constituent of black and white pepper, marjoram, oregano, rosemary, basil, thyme, geranium, agarwood, patchouli oil and cypriol oil. Furthermore, Rotundone was detected in various wines that exhibit peppery spicy notes, mainly Syrah (Shiraz) wines. The sesquiterpene has an aroma detection threshold in water of 8 ng/L, which is amongst the lowest for any natural product yet discovered (J. Agric. Food Chem. 2008, 56, 3738-3744 and references cited therein). Its odor threshold is also extremely low at 0.4 pg/L.

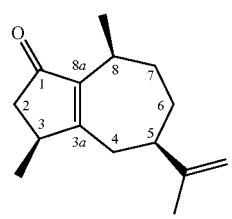

Rotundone

Moreover, an investigation of the aromas of grapefruit, orange, apple, and mango revealed the presence of Rotundone. Sensory analyses showed that the compound, when added at even subthreshold levels to model beverages of these fruits, did not confer directly a woody odor, but had significant effects on the overall flavors of the beverages, helping them to better approximate the natural flavors of the fruits (J. Agric. Food Chem. 2017, 65, 4464-4471).

It is known that close chemical derivatives of a fragrance or flavor ingredient do have significantly different aroma and odor properties, making them less interesting for use in flavoring and perfumery. Very often, the intensity of the fragrance or flavor is diminished for a derivative, or off-notes are significantly stronger. For example, it was determined via GC-sniff, that a racemic mixture of Rotundone isomerized at C3 has a very weak, woody, cork-like odor (see also J. Agric. Food Chem. 2017, 65, 5209-5214).

Surprisingly, it was now found that hydrogenated derivatives of Rotundone are potent odours and/or aroma compounds and can be useful in perfumery and flavoring, providing different facets of Rotundone, thereby broadening the perfumer's or flavourist's palette.

There is provided in a first embodiment the use of at least one compound according to formula I in the form of any one of its stereoisomers or a mixture thereof

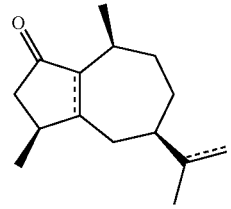

formula I wherein
 ═══ is indicating a single bond or a double bond, and the compound has one carbon-carbon double bond or no carbon-carbon double bond at all, as flavor or fragrance ingredient.

The compound of formula I comprise one or more chiral centers and as such may exist as a mixture of stereoisomers (more precisely diastereoisomers, as the configuration at carbon atoms 3, 5 and 8 is fixed), or may be resolved as pure stereoisomers. Resolving stereoisomers adds to the complexity of manufacture and purification of the compound, and so it is preferred to use the compound as mixture of its stereoisomers simply for economic reasons. However, if it is desired to prepare individual stereoisomers, this may be achieved according to methods known in the art, e.g. stereoselective synthesis, preparative HPLC and GC.

For the use as flavor or fragrance ingredient, at least one compound according to formula I may be present as a single stereoisomer, as a mixture of more than one stereoisomers of one chemical compound, or as a mixture of more than one chemical compound in the form of any one of its stereoisomers or a mixture thereof. In a further embodiment there is provided the use of at least one Dihydrorotundone, a compound according to formula I with one carbon-carbon double bond, which is represented by formula II or III, in the form of any one of its stereoisomers or a mixture thereof

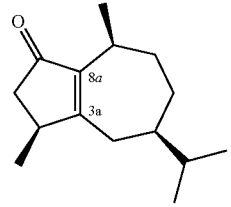

formula II

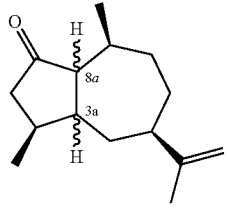

formula III wherein the wavy bonds are indicating an unspecified configuration at the carbon atoms 3a and 8a, as flavor or fragrance ingredient.

In a further embodiment there is provided the use of Tetrahydrorotundone, a compound according to formula IV, in the form of any one of its stereoisomers or a mixture thereof formula IV

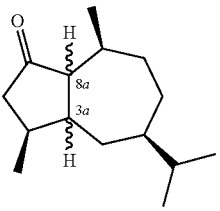

wherein the wavy bonds are indicating an unspecified configuration at the carbon atoms 3a and 8a, as flavor or fragrance ingredient.

In a further aspect, there is provided a compound according to formula I in the form of any one of its stereoisomers or a mixture thereof formula I

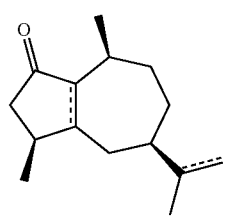 [SMILES: CC(C)[C@@H]1CC[C@H](C)C2=C(C1)[C@@H](C)CC2=O]

wherein
≡≡≡ is indicating a single bond or a double bond, and the compound has one carbon-carbon double bond or no carbon-carbon double bond at all,
and wherein the compound is not (3S,5R,8S)-5-isopropyl-3,8-dimethyl-3,4,5,6,7,8-hexahydroazulen-1(2H)-one.

Dihydro derivatives of Rotundone possess one carbon-carbon double bond in the overall structure.

formula II

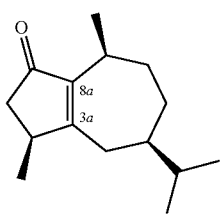

formula III

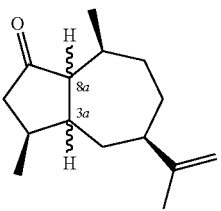

Compound of formula II ((3S,5R,8S)-5-isopropyl-3,8-dimethyl-3,4,5,6,7,8-hexahydroazulen-1(2H)-one) is a Rotundone derivative with a hydrogenated isopropenyl side chain, and the carbon-carbon double bond is located within the ring system between carbon atoms 3a and 8a. Said compound has been reported by Kapadia et al (Tetrahedron Letters 1967, 47, 4661-4667). No odor or flavor properties have been reported. Surprisingly, said compound of formula II still has an impressively low odor threshold of 5 pg/L.

In the compound of formula III ((3S,5R,8S)-3,8-dimethyl-5-(prop-1-en-2-yl)octahydroazulen-1(2H)-one), the carbon-carbon double bond is within the substituent of the ring system. The wavy bonds are indicating an unspecified configuration at the carbon atoms 3a and 8a, respectively. The general structure without any reference to the specific stereochemistry has been mentioned by Shono et al (J. Org. Chem. 1992, 57, 7157-7187). During hydrogenation of Rotundone to this dihydro derivative, two new stereocenters are formed, and the compound of formula III can be formed as a mixture of different stereoisomers, for example:

formula IIIa formula IIIb formula IIIc formula IIId

These isomers differ in the relative configuration of the hydrogen atoms at the carbon atoms 3a and 8a:
(3S,3aR,5R,8S,8aS)-3,8-dimethyl-5-(prop-1-en-2-yl)octahydroazulen-1(2H)-one (IIIa),
(3S,3aS,5R,8S,8aR)-3,8-dimethyl-5-(prop-1-en-2-yl)octahydroazulen-1(2H)-one (IIIb),
(3S,3aR,5R,8S,8aR)-3,8-dimethyl-5-(prop-1-en-2-yl)octahydroazulen-1(2H)-one (IIIc),
(3S,3aS,5R,8S,8aS)-3,8-dimethyl-5-(prop-1-en-2-yl)octahydroazulen-1(2H)-one (IIId).

Tetrahydro derivatives of Rotundone have no carbon-carbon double bond in the overall structure, which is represented by formula IV

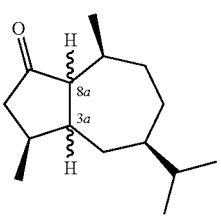

formula IV

The wavy bonds are indicating an unspecified configuration at the carbon atoms 3a and 8a, respectively. Like the compound of formula III, compound of formula IV can be formed as a mixture of different stereoisomers, with two new stereocenters at the carbon atoms 3a and 8a, for example:

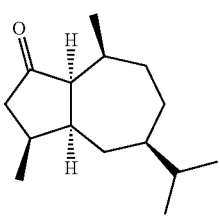

formula IVa

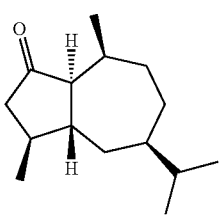

formula IVb

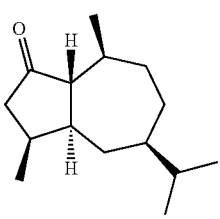

formula IVc

These isomers differ in the relative configuration of the hydrogen atoms at the carbon atoms 3a and 8a:
(3S,3aS,5R,8S,8aS)-5-isopropyl-3,8-dimethyloctahydroazulen-1(2H)-one,
(3S,3aR,5R,8S,8aS)-5-isopropyl-3,8-dimethyloctahydroazulen-1(2H)-one,
(3S,3aS,5R,8S,8aR)-5-isopropyl-3,8-dimethyloctahydroazulen-1(2H)-one.

Tetrahydrorotundone has been mentioned by Kapadia et al. (Tetrahedron Letters 1967, 47, 4661-4667). No information is given on the specific stereochemistry. No odor or flavor properties have been reported.

The structures of the hydrogenated derivatives have been compared with Rotundone itself. FIGS. 1-3 show an overlay of a derivative (grey) with Rotundone (black). The structures have been calculated with ACD/3D Viewer (2014) and rendered with PyMOL™ Molecular Graphics System, Version 2.1.0.

The two structures in FIG. 1 differ only in the side chain at position 5 of the ring system. Overall, the structures are very similar. The Dihydro derivative of Rotundone ((3S,5R,8S)-5-isopropyl-3,8-dimethyl-3,4,5,6,7,8-hexahydroazulen-1(2H)-one, compound of formula II) has a very low odor threshold of 5 pg/L, compared to 0.4 pg/L for Rotundone.

In FIG. 2, the structures of Rotundone and cis-Tetrahydrorotundone (3S,3aS,5R,8S,8aS)-5-isopropyl-3,8-dimethyloctahydroazulen-1(2H)-one, compound of formula IVa) are shown. Although the geometry of the derivative completely changes to a more globular structure, the compound surprisingly still has a strong odor of 6 pg/L. It loses some of its peppery aspects but develops a more woody, vetiver-like character which makes this compound extremely attractive for perfumery.

FIG. 3 shows an overlap of Rotundone and trans-Tetrahydrorotundone (major isomer, 3S,3aS,5R,8S,8aR)-5-isopropyl-3,8-dimethyloctahydroazulen-1(2H)-one, compound of formula IVc). Surprisingly, the trans configured Tetrahydrorotundone is less strong than Rotundone (odor threshold of 63 pg/L), although its topology resembles more that of Rotundone itself. Its character becomes more fruity, ionone-like.

Due to their desirable odour profiles, the compound of formula I is suitable for use as fragrance ingredient in all manner of perfumery applications. Similarly, its odour may also add aroma to foodstuffs, beverages and oral care products making them suitable as flavourant ingredient. In particular, the compound of formula I is suitable for use as fragrance ingredient or flavourant ingredient in articles with a citrus olfactive character or a citrus taste.

Accordingly, in another aspect of the invention there is provided a method to confer, enhance, improve or modify the hedonic properties of a fragrance composition or of a perfumed article, or of a flavour composition or flavoured article, which method comprises adding to said composition or article at least one compound of formula I.

Due to the surprising properties of the compound of formula I, the present invention provides in another of its aspects a fragrance or flavour composition or a flavoured or perfumed article comprising at least one compound of formula I.

Said fragrance or flavour composition may also comprise carrier materials for the compound of the formula I; a perfumery or flavour base; and other adjuvants useful in fragrance and flavour formulations.

The term "carrier materials" as used herein refers to materials that are neutral or practically neutral from a fragrance or flavour point of view, that is, the material does not significantly alter the organoleptic properties of fragrance or flavour ingredients.

As carrier materials one can mention, an emulsifying system, i. e. a solvent and a surfactant system, or a solvent commonly used in perfumery or flavours applications. A detailed description of the nature and type of solvents commonly used in perfumery or the flavours industry cannot be exhaustive. However, one can cite as non-limiting examples of solvents useful in perfumery dipropyleneglycol, diethyl phthalate, isopropyl myristate, benzyl benzoate, 2-(2-ethoxyethoxy)-1-ethanol or ethyl citrate.

Carrier materials may also include absorbing gums or polymers, or encapsulating materials. Encapsulation is a well-known process to a person skilled in the art, and may be performed, for instance, using techniques such as spray-drying, agglomeration or wet extrusion, or by coacervation or complex coacervation techniques.

The term "perfumery or flavour base" as used herein means a composition comprising at least one perfuming or flavourant co-ingredient that is different from a compound of formula I.

Moreover, the co-ingredients are used to impart a hedonic effect. For example, such a co-ingredient, if it is to be considered as being a perfuming co-ingredient, must be recognized by a person skilled in the art as being able to impart or modify in a positive or pleasant way the odor of a composition, and not just as having an odor. Similarly, if the co-ingredient is a flavourant it is recognised by a person skilled in the art as being able to create, modify or enhance a flavour accord.

The nature and type of the perfuming or flavourant co-ingredients present in the base do not warrant a more detailed description here, which in any case would not be exhaustive, the skilled person being able to select them on the basis of its general knowledge and according to intended use or application and the desired organoleptic effect.

In general terms, perfuming co-ingredients belong to chemical classes as varied as alcohols, aldehydes, ketones, esters, ethers, acetates, nitriles, terpene hydrocarbons, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said co-ingredients may also be compounds known to release in a controlled manner various types of perfuming compounds.

Specific examples of flavour co-ingredients may include but are not limited to natural flavors, artificial flavors, spices, seasonings, and the like. Exemplary flavoring co-ingredients include synthetic flavor oils and flavoring aromatics and/or oils, oleoresins, essences, distillates, and extracts derived from plants, leaves, flowers, fruits, and so forth, and a combination comprising at least one of the foregoing.

Exemplary flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavoring agents include artificial, natural and synthetic fruit flavors such as vanilla, and citrus oils including lemon, orange, lime, grapefruit, yuzu, sudachi, and fruit essences including apple, pear, peach, grape, blueberry, strawberry, raspberry, cherry, plum, prune, raisin, cola, guarana, neroli, pineapple, apricot, banana, melon, apricot, ume, cherry, raspberry, blackberry, tropical fruit, mango, mangosteen, pomegranate, papaya and so forth. Additional exemplary flavors imparted by a flavoring agent include a milk flavor, a butter flavor, a cheese flavor, a cream flavor, and a yogurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; a nut flavor such as an almond flavor, a hazelnut flavor, a macadamia nut flavor, a peanut flavor, a pecan flavor, a pistachio flavor, and a walnut flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor.

Flavour co-ingredients may include aldehydes and esters such as cinnamyl acetate, cinnamaldehyde, citral diethylacetal, dihydrocarvyl acetate, eugenyl formate, p-methylanisol, and so forth can be used. Further examples of aldehyde flavorings include acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), and the like. Generally any flavoring or food additive such as those described in Chemicals Used in Food Processing, publication 1274, pages 63-258, by the National Academy of Sciences, can be used. This publication is incorporated herein by reference.

The term "adjuvant" as used herein means an ingredient that affects the performance of a composition other than its hedonic performance. For example, an adjuvant may be an ingredient that acts as an aid to processing a composition or article containing a composition, or it may improve handling or storage of said composition or article. It might also be an ingredient that provides additional benefits such as imparting colour or texture to a composition or article. It might also be an ingredient that imparts light resistance or chemical stability to one or more ingredients contained in the composition or article. A detailed description of the nature and type of adjuvant commonly used in perfuming and flavourant compositions cannot be exhaustive, but it has to be mentioned that said ingredients are well known to a person skilled in the art. Examples of adjuvants include solvents and co-solvents; surfactants and emulsifiers; viscosity and rheology modifiers; thickening and gelling agents; preservative materials; pigments, dyestuffs and colouring matters; extenders, fillers and reinforcing agents; stabilisers against the detrimental effects of heat and light, bulking agents, acidulants, buffering agents and antioxidants.

Furthermore, the compounds of formula I can be used in all the fields of modern perfumery and flavour technology to positively impart or modify the odour of a composition or article into which said compound I is added. Consequently, a perfumed or flavoured article comprising at least one compound of formula I constitutes another aspect of the present invention.

The nature and type of the constituents of the article do not warrant a more detailed description here, which in any case would not be exhaustive, the skilled person being able to select them on the basis of its general knowledge and according to the nature and the desired effect of said product.

Examples of suitable articles include consumer products that may include solid or liquid detergents and fabric softeners as well as all the other articles common in perfumery, namely perfumes, colognes or after-shave lotions, perfumed soaps, shower or bath salts, mousses, oils or gels, hygiene products or hair care products such as shampoos, body-care products, deodorants or antiperspirants, air fresheners and also cosmetic preparations. As detergents there are intended applications such as detergent compositions or cleaning products for washing up or for cleaning various surfaces, e. g. intended for textile, dish or hard-surface treatment, whether they are intended for domestic or industrial use. Other perfumed articles are fabric refreshers, ironing waters, papers, wipes or bleaches.

Consumer products may also include any solid or liquid composition that is consumed for at least one of nourishment and pleasure, or intended to be held in the mouth for a period of time before being discarded. A broad general list includes, but is not limited to, foodstuffs of all kinds, confectionery, baked goods, sweet goods, dairy products and beverages, and oral care products.

Some of the above-mentioned consumer product bases may represent an aggressive medium for compounds of the formula I, so that it may be necessary to protect the latter from premature decomposition, for example by encapsulation.

The proportions in which the compounds of formula I can be incorporated into the various aforementioned articles or compositions vary within a wide range of values. These values are dependent on the nature of the article to be perfumed and on the desired organoleptic effect as well as the nature of the co-ingredients in a given base when the compounds according to the invention are mixed with perfuming or flavourant co-ingredients, solvents or additives commonly used in the art.

For example, in the case of fragrance compositions, typical concentrations are in the order of 0.01% to 3% by weight, or even more, of the compounds of formula I based on the weight of the composition into which they are incorporated. Concentrations lower than these, such as in the order of 0.0001% to 0.5% by weight, can be used when these compounds are incorporated into perfumed articles.

In the case of flavor compositions, typical concentrations are in the order of 0.01% to 3% by weight, or even more, of the compounds of formula I based on the weight of the composition into which they are incorporated. Concentrations lower than these, such as in the order of 0.0001% to 0.05% by weight, can be used when these compounds are incorporated into flavoured articles.

EXAMPLES

Example 1: (−)-(3S,5R,8S)-5-isopropyl-3,8-dimethyl-3,4,5,6,7,8-hexahydroazulen-1(2H)-one

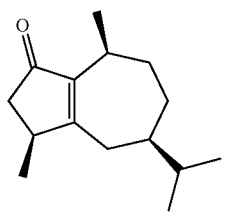

Platin(IV)-oxide hydrate (110 mg) was added to the solution of Rotundone (2.0 g, 90% pure, 8.2 mmol) in hexane (100 mL). Hydrogenation was effected under 0.3 bar H$_2$ and magnetic stirring at 0° C. for 2.5 h, then at room temperature for 3 h. Additional Platin(IV)-oxide hydrate (80 mg) was added, and stirring under 0.3 bar H$_2$ at room temperature was continued for 4 h. The mixture was filtered, the solvent evaporated, and the residue was submitted again to the above hydrogenation procedure in order to convert traces of residual starting material. The residue (1.99 g) was purified by flash chromatography on SiO$_2$ with hexane/MTBE 50:1 to yield (−)-(3S,5R,8S)-5-isopropyl-3,8-dimethyl-3,4,5,6,7,8-hexahydroazulen-1(2H)-one (1.20 g, 59%) as a colourless oil. The product was further purified by Kugelrohr distillation (135° C./0.06 mbar, 72% distillation yield). The resulting product was olfactorily pure and contained (−)-(3S,5R,8S)-5-isopropyl-3,8-dimethyl-3,4,5,6,7,8-hexahydroazulen-1(2H)-one in 91% besides 4% of a not further identified diastereomer, 0.7% of 1,4,9,9-tetramethyloctahydro-4,7-methanoazulen-3(2H)-one and 4.3% of 9-isopropyl-2,6-dimethylcyclodecane-1,5-dione.

$[\alpha]_D = -57.5$ (c=0.65 in CHCl$_3$). $^1$H-NMR (400 MHz, CDCl$_3$): 2.90-3.02 (m, 1H), 2.65-2.77 (m, 1H), 2.59 (dd, J=18.5, 6.5 Hz, 1H), 2.20-2.45 (m, 2H), 1.92-2.01 (dt, J=18.6, 1.0 Hz, 1H), 1.62-1.82 (m, 4H), 1.41-1.53 (m, 1H), 1.21-1.33 (m, 1H), 1.14 (d, J=7.1 Hz, 3H), 0.99 (d, J=7.1 Hz, 3H), 0.91 (dd, J=6.8, 1.7 Hz, 6H). $^{13}$C-NMR (101 MHz, CDCl$_3$): 208.1 (s), 178.0 (s), 145.1 (s), 43.9 (d), 43.0 (t), 37.9 (d), 34.5 (d), 34.4 (t), 32.9 (t), 27.7 (t), 27.0 (d), 19.3 (q), 19.1 (q), 18.9 (q), 17.7 (q). MS (EI, 70 eV): 220 (10, M$^+$), 205 (2), 177 (100), 163 (7), 143 (16), 138 (24), 123 (11), 121 (15), 107 (24), 91 (25), 79 (16), 69 (10), 55 (15), 43 (17), 41 (25).

Odour: spicy, freesia, cashmerane, raspberry, woody, tobacco.

GC-OTH: 5.5 pg/L air.

Example 2: (3S,3aS,5R,8S,8aR)-3,8-dimethyl-5-(prop-1-en-2-yl)octahydroazulen-1(2H)-one and (3S,3aR,5R,8S,8aS)-3,8-dimethyl-5-(prop-1-en-2-yl)octahydroazulen-1(2H)-one

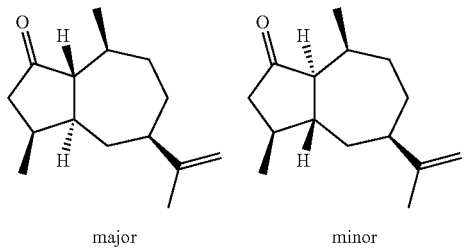

major                minor

In a 500 mL two necked flask equipped with a cooler and a thermometer was added magnesium powder (1.5 g, 61.5 mmol, 2.1 equiv) at 0° C. to Rotundone ((3S,5R,8S)-3,8-dimethyl-5-(prop-1-en-2-yl)-2,3,5,6,7,8-hexahydroazulen-1(4H)-one) (6.55 g, 30 mmol, 1.0 equiv) in MeOH (150 mL). The reaction was stirred at 0° C., allowing the mixture to reach ambient temperature overnight. The reaction mixture was then quenched using 250 mL 2N HCl, and further stirred at room temperature for 15 minutes. The resulting biphasic system was poured onto H$_2$O, extracted twice with MTBE, washed with a diluted NaHCO$_3$ solution and brine, dried over MgSO$_4$, and the volatiles evaporated. The resulting crude product was first purified by flash column chromatography using a gradient of 0-8% of ethyl acetate in hexane, then distilled by bulb-to-bulb distillation at 150° C. and 0.07 Torr to yield 1.56 g of (3S,3aS,5R,8S,8aR)-3,8-dimethyl-5-(prop-1-en-2-yl)octahydroazulen-1(2H)-one and (3S,3aR, 5R,8S,8aS)-3,8-dimethyl-5-(prop-1-en-2-yl)octahydroazulen-1(2H)-one in a ratio 6:4 (19% yield, 75.8% purity). The resulting product contained, additionally to the title compound in 75.8%, 12.3%, 2.2%, and 3.5% of non-identified isomers.

Odour: woody, spicy, warm round, peppery cashmeran rotundone, warm sweet fruity woody ambery, orris irone boisiris, hint raspberry GC-OTH: 63 pg/l air The major isomer has been isolated by preparative gas chromatography on a FS-Supelcowax 10 column (30 m*0.75 mm*1.0 μm) with a 80 kPa N₂ carrier gas flow at 160° C. isothermal temperature for stereochemical assignment by NMR spectroscopy. The NMR peaks corresponding to the minor constituent could be assigned by deduction from the spectrum of the mixture.

Major isomer: $^1$H-NMR (600 MHz, $C_6D_6$): 4.79-4.75 (2H, m), 2.01 (1H, dd, J=17.6, 7.8), 1.85-1.68 (4H, m), 1.64 (3H, s), 1.62 (1H, m), 1.57 (1H, m), 1.50-1.42 (3H, m), 1.38 (1H, m), 1.31 (3H, d, J=6.8 Hz), 1.26 (1H, m), 1.10 (1H, m), 0.52 (3H, d, J=7.3 Hz). $^{13}$C-NMR (150 MHz, $C_6D_6$, shifts extracted from HSQC & HMBC experiments): 219.2 (s), 151.2 (s), 108.8 (t), 55.7 (d), 50.0 (d), 47.3 (t), 42.7 (d), 39.3 (t), 34.0 (t), 33.1 (t), 32.2 (t), 28.1 (t), 22.4 (q), 20.8 (q), 14.4 (q). MS (EI, 70 EV): 220 (25, M⁺), 149 (66), 110 (62), 107 (69), 97 (76), 93 (75), 81 (60), 69 (67), 67 (80), 55 (84), 41 (100).

Minor isomer: $^1$H-NMR (500 MHz, $C_6D_6$): 4.77 (1H, m), 4.73 (1H, m), 2.59 (1H, m), 2.20 (1H, ddd, J=17.8, 7.1, 1.1 Hz), 2.03 (1H, m), 1.78 (1H, ddd, J=14.1, 8.9, 6.6 Hz), 1.74 (1H, ddd, J=11.8, 3.6, 1.2), 1.61 (3H, m), 1.52 (1H, m), 1.46-1.36 (2H, m), 1.41 (1H, dd, J=17.8, 12.5 Hz), 1.37-1.29 (2H, m), 1.26-1.12 (2H, m), 0.79 (3H, d, J=6.4 Hz), 0.71 (3H, d, J=7.1 Hz). $^{13}$C-NMR (125 MHz, $C_6D_6$): 216.9 (s), 151.2 (s), 108.8 (t), 59.1 (d), 48.0 (t), 46.2 (d), 41.2 (d), 37.4 (d), 36.1 (t), 35.6 (t), 30.4 (d), 27.3 (t), 20.0 (q), 18.0 (q), 14.9 (q). MS (EI, 70 EV):) 220 (24, M⁺), 109 (71), 107 (59), 97 (84), 95 (51), 93 (72), 79 (54), 69 (66), 67 (77), 55 (90), 41 (100).

Example 3: (3S,3aS,5R,8S,8aS)-5-isopropyl-3,8-dimethyloctahydroazulen-1(2H)-one

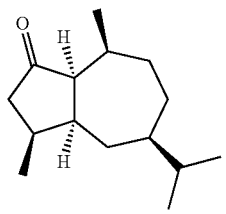 [SMILES: CC(C)[C@@H]1CC[C@H](C)[C@@H]2C(=O)C[C@H](C)[C@@H]2C1]

In a 120 mL premex autoclave, Pd/C (10 wt % of Pd, 0.55 g, 0.52 mmol, 3.1 mol %) was added at room temperature under a positive flow of N₂ to a solution of Rotundone ((3S,5R,8S)-3,8-dimethyl-5-(prop-1-en-2-yl)-2,3,5,6,7,8-hexahydroazulen-1(4H)-one) (3.28 g, 15 mmol, 1.0 equiv.) in 60 mL of ethanol. The reaction vessel was closed, purged with hydrogen (3 times), and the reaction mixture stirred under a 5 bar atmosphere of hydrogen at room temperature. After 16 hours, the reaction vessel was opened to ambient air, the suspension filtered over a pad of Celite which was rinsed with EtOH. The volatiles were evaporated.

The resulting crude product was first purified by flash column chromatography using a gradient of 2-10% of ethyl acetate in hexane, then distilled by bulb-to-bulb distillation at 150° C. and 0.07 Torr to yield 1.65 g of (3S,3aS,5R,8S,8aS)-5-isopropyl-3,8-dimethyloctahydroazulen-1(2H)-one (42% yield, 94.9% purity). The resulting product contained, additionally to the title compound in 94.9%, 2.7% of (3S,3aR,5R,8S,8aS)-5-isopropyl-3,8-dimethyloctahydroazulen-1(2H)-one, and 2.4% of a non-identified diastereoisomer.

$[\alpha]_D$=+42.9 (c=0.385 in EtOH). $^1$H-NMR (400 MHz, CDCl₃): 2.43 (1H, dd, J=7.70, 2.93 Hz), 2.28-2.37 (1H, m), 2.17-2.28 (1H, m), 1.99-2.15 (1H, m), 1.63-1.73 (1H, m), 1.51-1.60 (2H, m), 1.44-1.51 (2H, m), 1.33-1.44 (2H, m), 1.22-1.31 (1H, m), 1.18 (3H, d, J=7.34 Hz), 1.03 (3H, d, J=6.60 Hz), 0.94-0.97 (1H, m), 0.95 (1H, ddt, J=14.31, 3.30, 1.00, 1.00 Hz), 0.84 (3H, d, J=3.91 Hz), 0.83 (3H, d, J=3.79 Hz). $^{13}$C-NMR (101 MHz, CDCl₃): 220.0 (s), 60.8 (d), 46.5 (d), 45.1 (t), 42.2 (d), 34.2 (d), 33.0 (d), 30.6 (d), 30.0 (t), 28.3 (t), 27.3 (t), 21.3 (s), 19.0 (s), 19.0 (s), 16.3 (s). MS (EI, 70 eV): 222 (M⁺, 5) 179 (100), 110 (13), 97 (28), 95 (23), 81 (16), 69 (15), 67 (16), 55 (21), 43 (14), 41 (26).

Odour: woody, foral fruity, spicy peppery, rotundone

GC-OTH: 6 pg/L air

Example 4: (3S,3aS,5R,8S,8aR)-5-isopropyl-3,8-dimethyloctahydroazulen-1(2H)-one and (3S,3aR,5R,8S,8aS)-5-isopropyl-3,8-dimethyloctahydroazulen-1(2H)-one

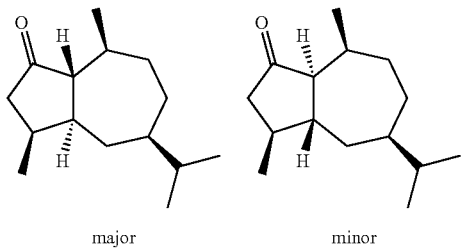

major                minor

In a 100 ml 3-necked flask was added Pd/C (5 wt %, 0.5 g) to 1.56 g of (3S,3aS,5R,8S,8aR)-3,8-dimethyl-5-(prop-1-en-2-yl)octahydroazulen-1(2H)-one and (3S,3aR,5R,8S,8aS)-3,8-dimethyl-5-(prop-1-en-2-yl)octahydroazulen-1(2H)-one (as obtained in Example 2) in EtOH (40 mL) under an atmosphere of Argon at room temperature. The Argon atmosphere was exchanged by a hydrogen atmosphere from a balloon, and the substrate hydrogenated for 4 hours at ambient temperature. The reaction mixture was then filtered over a Celite pad which was rinsed with EtOH. The volatiles were evaporated. The crude product was purified by bulb-to-bulb distillation at 150° C. and 0.07 Torr to yield 1.49 g of (3S,3aS,5R,8S,8aR)-5-isopropyl-3,8-dimethyloctahydroazulen-1(2H)-one and (3S,3aS,5R,8S,8aR)-5-isopropyl-3,8-dimethyloctahydroazulen-1(2H)-one in a 6:4 ratio.

Odour: woody fruity, irone raspberry isoraldeine (musky) cashmeran, woody ambery GC-OTH: 0.33 ng/l air Both isomers have been separated by preparative gas chromatography on a FS-Supelcowax 10 column (30 m*0.75 mm*1.0 μm) with a 80 kPa N2 carrier gas flow at 135° C. isothermal temperature for stereochemical assignment by NMR spectroscopy.

Major isomer: $^1$H-NMR (600 MHz, $C_6D_6$): 2.04 (1H, dd, J=17.6, 7.8 Hz), 1.83 (1H, dd, J=17.6, 0.8 Hz), 1.81-1.72

(2H, m), 1.59 (1H, m), 1.52-1.36 (5H, m), 1.34 (3H, d, J=6.7 Hz), 1.31 (1H, m), 1.05-0.97 (2H, m), 0.92 (1H, m), 0.84 (3H, d, J=6.8 Hz), 0.83 (3H, d, J=6.8 Hz), 0.56 (3H, d, J=7.3 Hz). $^{13}$C-NMR (150 MHz, $C_6D_6$, shifts extracted from HSQC & HMBC experiments): 219.4 (s), 55.7 (d), 47.8 (d), 47.4 (t), 42.7 (d), 36.6 (t), 34.1 (t), 33.7 (d), 33.3 (d), 32.4 (d), 25.5 (t), 22.4 (q), 19.8 (2 q), 14.4 (q). MS (EI, 70 eV): 222 ($M^+$, 21), 179 (100), 109 (27), 97 (39), 95 (53), 81 (3S), 69 (34), 67 (31), 55 (42), 43 (24), 41 (45).

Minor isomer: $^1$H-NMR (600 MHz, $CDCl_3$): 2.51-2.38 (2H, m), 2.08 (1H, ddd, J=11.2, 3.4, 1.8 Hz), 1.82 (1H, ddd, J=13.3, 9.1, 6.0 Hz), 1.78-1.62 (4H, m), 1.58 (1H, m), 1.49 (1H, dddd, J=14.2, 11.1, 5.2, 2.6 Hz), 1.43-1.28 (4H, m), 1.14. $^{13}$C-NMR (150 MHz, $CDCl_3$, shifts extracted from HSQC & HMBC experiments): 220.8 (s), 59.2 (d), 48.5 (t), 44.1 (d), 41.2 (d), 37.8 (d), 36.2 (t), 33.5 (d), 33.3 (t), 24.8 (t), 19.2 (2 q), 18.3 (q), 14.9 (q). MS (EI, 70 eV): 222 ($M^+$, 9), 179 (100), 109 (31), 97 (67), 95 (53), 81 (3S), 69 (32), 67 (29), 55 (39), 43 (23), 41 (44).

Example 5: Tasting of Dihydro- and Tetrahydrorotundone

The compounds have been tasted in acidified beverage (water+8% sucrose+0.1% citric acid) at 100 ppt and 100 ppb by 4 technical experts.

TABLE 1

| Sample | compound(s) of formula | concentration | description |
|---|---|---|---|
| Rotundone | | | reference |
| cis-Tetrahydrorotundone | IVa | 100 ppt | good front end Rotundone |
| cis-Tetrahydrorotundone | IVa | 100 ppb | weak, Rotundone taste |
| trans-Dihydrorotundone (mixture) | IIIa + IIIb | 100 ppt | Rotundone note |
| trans-Dihydrorotundone (mixture) | IIIa + IIIb | 100 ppb | weak |
| trans-Tetrahydrorotundone (mixture) | IVb + IVc | 100 ppt | no true Rotundone character |
| trans-Tetrahydrorotundone (mixture) | IVb + IVc | 100 ppb | weak |

The taste of all derivatives has been described as fruity, floral, peppery, and each derivative shows further aspects. cis-Tetrahydrorotundone and trans-Dihydrorotundone are reminiscent to Rotundone.

Example 6: Comparison of Rotundone and Hydrogenated Derivatives in Fragrance Applications The hydrogenated derivatives have been assessed against Rotundone. For the bloom, 2 mL of a shampoo base containing 0.02% of a testing compound is dissolved in 10 of water and placed in a defined cabin. For the room fragrancing, 3 smelling blotters have been dipped in a solution containing 0.02% of a testing compound and placed in a defined cabin. After an equilibration time of 20-30 minutes, the bloom/the room fragrance in the cabin is evaluated during a time period of 15 min.

A group of 5 panelists has rated the bloom and room fragrance on a scale from 0 to 10.

TABLE 2

| Sample | compound(s) of formula | Bloom (shampoo) | Room fragrancing (blotter) |
|---|---|---|---|
| Rotundone | | 3.3 | 4.3 |
| trans-Dihydrorotundone (mixture) | IIIa + IIIb | 2.2 | 2.0 |
| cis-Tetrahydrorotundone | IVa | 2.8 | 3.8 |
| trans-Tetrahydrorotundone (mixture) | IVb + IVc | 1.5 | 1.6 |

Example 7: Comparison of Rotundone and Cis-Tetrahydrorotundone (Compound of Formula IVa) in Perfume Formula The ingredients of the formula are given in gram. The two compounds have been blended into a perfume formula intended to be applied in 1% in a shower gel.

TABLE 3

| | A | B | C |
|---|---|---|---|
| ALDEHYDE C 10 DECYLIC | 4 | 4 | 4 |
| ALDEHYDE C 12 LAURIC | 2 | 2 | 2 |
| ALDEHYDE C 8 OCTYLIC FOOD GRADE | 3 | 3 | 3 |
| ALDEHYDE C 9 NONYLIC FOOD GRADE | 1.5 | 1.5 | 1.5 |
| ALLYL CAPROATE | 5 | 5 | 5 |
| BENZYL ACETATE | 20 | 20 | 20 |
| CITRATHAL R | 30 | 30 | 30 |
| CITRONELLOL EXTRA | 30 | 30 | 30 |
| CITRONELLYL ACETATE | 40 | 40 | 40 |
| CYCLAL C | 2 | 2 | 2 |
| DAMASCONE ALPHA | 10 | 10 | 10 |
| DIHYDRO MYRCENOL | 60 | 60 | 60 |
| DIMETHYL OCTENONE | 10 | 10 | 10 |
| HEDIONE | 60 | 60 | 60 |
| HEXENOL TRANS-2 | 5 | 5 | 5 |
| ISO E SUPER | 40 | 40 | 40 |
| ISORALDEINE 70 | 30 | 30 | 30 |
| LINALOOL SYNTHETIC | 180 | 180 | 180 |
| LINALYL ACETATE SYNTHETIC | 40 | 40 | 40 |
| MANZANATE | 4 | 4 | 4 |
| ORANGE OIL BRAZIL | 160 | 160 | 160 |
| PARADISAMIDE | 20 | 20 | 20 |
| PETALIA | 30 | 30 | 30 |
| PHENYL ETHYL ALCOHOL | 40 | 40 | 40 |
| RASPBERRY KETONE (N112) | 2 | 2 | 2 |
| SYLKOLIDE | 30 | 30 | 30 |
| VANILLIN @ 10% TEC | 1 | 1 | 1 |
| cis-Tetrahydrorotundone (compound of formula IVa) | | 1 | |
| Rotundone | | | 1 |
| TRIETHYL CITRATE | 140.5 | 139.5 | 139.5 |
| total | 1000 | 1000 | 1000 |

The perfume as such (entry A) does have a fresh citrus olfactive character, with a juicy sweet facet.

Rotundone brings a clear olfactive contribution to the perfume when assessed in neat and under the shower. The perfume (entry C) is now wrapped in a warm spicy depth, and the soft round musky aspect is enhanced. Cis-Tetrahydrorotundone also brings a clear and significant olfactive contribution to the neat and under the shower. The perfume (entry B) has now a woody spicy peppery warmth, which enhances the richness and depth.

Example 8: (3S,3aR,5R,8S,8aR)-3,8-dimethyl-5-(prop-1-en-2-yl)octahydroazulen-1(2H)-one (isomer a) and (3S,3aS,5R,8S,8aS)-3,8-dimethyl-5-(prop-1-en-2-yl)octahydroazulen-1(2H)-one (Isomer b)

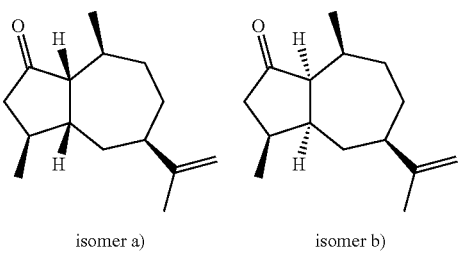

isomer a)     isomer b)

In a 100 mL sulfonation flask, equipped with a dry-ice cooler, 30 mL of ammonia have been condensed at −40° C. Then 0.14 g (20.1 mmol, 3.5 equiv.) lithium wire was added under Ar upon which the mixture turned black. The mixture was stirred for 30 minutes at −30° C., upon which 1.55 g (5.75 mmol, 1.0 mmol, 81% purity) Rotundone ((3S,5R,8S)-3,8-dimethyl-5-(prop-1-en-2-yl)-2,3,5,6,7,8-hexahydroazulen-1(4H)-one) in 10 mL THF was added. After 2.5 hours, the cooling bath was removed and the reaction mixture diluted with further 10 mL of THF then stirred overnight until all the ammonia was consumed. The reaction mixture was then cooled to 3° C., poured onto 80 mL ice-cold 2M HCl (2M) and extracted twice with MTBE. The organic layers were washed with $H_2O$ and brine, dried over $MgSO_4$, filtered and evaporated. The crude material was then first subjected to column chromatography using a gradient from 0-10% of ethyl acetate in heptane over 12 column volumes, yielding one fraction with majorly (3S,3aR,5R,8S,8aS)-3,8-dimethyl-5-(prop-1-en-2-yl)octahydroazulen-1(2H)-one, and one fraction containing (3S,3aR,5R,8S,8aS)-3,8-dimethyl-5-(prop-1-en-2-yl) octahydroazulen-1(2H)-one and (3S,3aS,5R,8S,8aR)-3,8-dimethyl-5-(prop-1-en-2-yl)octahydroazulen-1(2H)-one (compounds of example 2) as major isomers along with two further isomers which have been isolated by preparative GC on a nonpolar column.

Isomer a):

$^1$H-NMR (600 MHz, $CDCl_3$): 4.77 (s, 1H), 4.75 (s, 1H), 2.44 (d, J=18.6, 7.7 Hz, 1H), 2.30 (m, 1H), 2.19-2.08 (m, 3H), 2.00 (m, 1H), 1.93-1.79 (m, 3H), 1.73 (s, 3H), 1.72-1.67 (s, 1H), 1.58-1.53 (m, 2H), 1.47 (m, 1H), 1.09 (d, J=6.4 Hz, 3H), 1.09 (d, J=6.8 Hz, 3H). $^{13}$C-NMR (150 MHz, $CDCl_3$): 220.7, 149.3, 109.4, 57.6, 45.0 43.9, 41.6, 34.8, 33.8, 32.9, 32.1, 31.1, 22.1, 21.3, 20.3. MS (EI, 70 eV): 220 (15, [M]+•), 138 (49), 110 (52), 97 (74), 93 (57), 79 (50), 69 (54), 67 (69), 55 (67), 41 (100), 39 (47).

Odour: spicy, peppery, Rotundone, warm, round, suave, smoky, guaiac.

GC-OTH: 0.02 ng/l air.

Isomer b):

$^1$H-NMR (600 MHz, $CDCl_3$): 4.67 (m, 1H), 4.61 (m, 1H), 2.49 (dd, J=8.5, 3.2 Hz, 1H), 2.40-2.28 (m, 3H), 2.22-2.15 (m, 2H), 1.86 (dd, J=17.9, 9.2 Hz, 1H), 1.76 (m, 1H), 1.71 (s, 3H), 1.66 (m, 1H), 1.60 (m, 2H), 1.53-1.45 (m, 2H), 1.27 (td, J=13.2, 10.2 Hz, 1H), 1.18 (d, J=7.5 Hz, 3H), 1.01 (d, J=6.8 Hz, 3H). $^{13}$C-NMR (150 MHz, $CDCl_3$): 219.7, 152.1, 108.0. 60.2, 45.8, 45.2, 45.1, 32.8, 31.1, 30.4 (2C), 30.2, 20.8, 19.7, 16.2. MS (EI, 70 eV): 220 (7, [M]+•), 163 (47), 110 (100), 107 (30), 97 (48), 93 (37), 79 (30), 69 (3S), 67 (45), 55 (41), 41 (61).

Odour: warm, spicy, peppery, slightly woody, ambery, dark, Georgywood facet.

GC-OTH: 0.006 ng/l air.

The invention claimed is:

1. A flavor or fragrance ingredient compound according to formula I in the form of any one of its stereoisomers or a mixture thereof

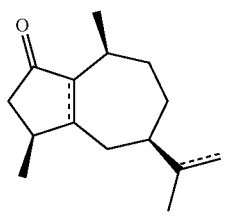

formula I wherein
------ indicates a single bond or a double bond, and
the compound has overall, one carbon-carbon double bond or no carbon-carbon double bond at all.

2. The compound of claim 1, wherein the compound according to formula I has one carbon-carbon double bond and is represented by formula II or III

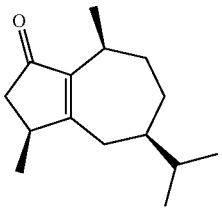

formula II

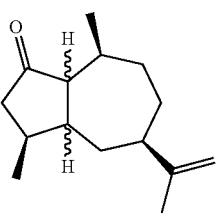

formula III and wherein the wavy bonds indicate an unspecified configuration at the attached carbon atom, respectively.

3. The compound of claim 1, wherein the compound according to formula I has no carbon-carbon double bond and is represented by formula IV

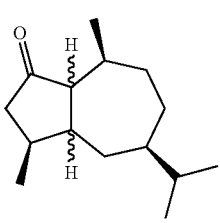

formula IV and wherein the wavy bonds indicate an unspecified configuration at the attached carbon atom, respectively.

4. The compound of claim 1 selected from the group consisting of:
(3S,3aR,5R,8S,8aS)-3,8-dimethyl-5-(prop-1-en-2-yl)octahydroazulen-1(2H)-one,
(3S,3aS,5R,8S,8aR)-3,8-dimethyl-5-(prop-1-en-2-yl)octahydroazulen-1(2H)-one,
(3S,3aR,5R,8S,8aR)-3,8-dimethyl-5-(prop-1-en-2-yl)octahydroazulen-1(2H)-one,
(3S,3aS,5R,8S,8aS)-3,8-dimethyl-5-(prop-1-en-2-yl)octahydroazulen-1(2H)-one,
(3S,3aS,5R,8S,8aS)-5-isopropyl-3,8-dimethyloctahydroazulen-1(2H)-one,
(3S,3aR,5R,8S,8aS)-5-isopropyl-3,8-dimethyloctahydroazulen-1(2H)-one, and
(3S,3aS,5R,8S,8aR)-5-isopropyl-3,8-dimethyloctahydroazulen-1(2H)-one.

5. A consumer product comprising at least one compound according to formula I of claim 1.

6. The consumer product of claim 5 selected from fine perfumery, household products, laundry products, body care products, cosmetic and air care products.

7. The consumer product of claim 5 selected from a foodstuff, beverage and oral care product.

8. A method to confer, enhance, improve or modify the hedonic properties of a fragrance or of a flavor composition or of a consumer product, which method comprises adding to said fragrance or said flavor composition or to said consumer product at least one compound of formula I of claim 1.

9. A compound according to formula I in the form of any one of its stereoisomers or a mixture thereof

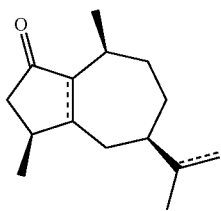

formula I wherein $\equiv\equiv\equiv\equiv\equiv$ is indicating a single bond or a double bond, and the compound has overall one carbon-carbon double bond or no carbon-carbon double bond at all, and wherein the compound is selected from the group consisting of:
(3S,3aR,5R,8S,8aS)-3,8-dimethyl-5-(prop-1-en-2-yl)octahydroazulen-1(2H)-one,
(3S,3aS,5R,8S,8aR)-3,8-dimethyl-5-(prop-1-en-2-yl)octahydroazulen-1(2H)-one,
(3S,3aR,5R,8S,8aR)-3,8-dimethyl-5-(prop-1-en-2-yl)octahydroazulen-1(2H)-one,
(3S,3aS,5R,8S,8aS)-3,8-dimethyl-5-(prop-1-en-2-yl)octahydroazulen-1(2H)-one,
(3S,3aS,5R,8S,8aS)-5-isopropyl-3,8-dimethyloctahydroazulen-1(2H)-one,
(3S,3aR,5R,8S,8aS)-5-isopropyl-3,8-dimethyloctahydroazulen-1(2H)-one, and
(3S,3aS,5R,8S,8aR)-5-isopropyl-3,8-dimethyloctahydroazulen-1(2H)-one.

10. A fragrance or a flavor composition comprising at least one compound according to formula I as defined in claim 1 wherein the compound is selected from the group consisting of:
(3S,3aR,5R,8S,8aS)-3,8-dimethyl-5-(prop-1-en-2-yl)octahydroazulen-1(2H)-one,
(3S,3aS,5R,8S,8aR)-3,8-dimethyl-5-(prop-1-en-2-yl)octahydroazulen-1(2H)-one,
(3S,3aR,5R,8S,8aR)-3,8-dimethyl-5-(prop-1-en-2-yl)octahydroazulen-1(2H)-one,
(3S,3aS,5R,8S,8aS)-3,8-dimethyl-5-(prop-1-en-2-yl)octahydroazulen-1(2H)-one,
(3S,3aS,5R,8S,8aS)-5-isopropyl-3,8-dimethyloctahydroazulen-1(2H)-one,
(3S,3aR,5R,8S,8aS)-5-isopropyl-3,8-dimethyloctahydroazulen-1(2H)-one, and
(3S,3aS,5R,8S,8aR)-5-isopropyl-3,8-dimethyloctahydroazulen-1(2H)-one.

\* \* \* \* \*